United States Patent
Natal et al.

(10) Patent No.: US 10,826,827 B1
(45) Date of Patent: Nov. 3, 2020

(54) SYSTEMS AND METHODS FOR VIRTUAL PREFIX AGGREGATION IN ON-DEMAND OVERLAY NETWORKS

(71) Applicant: Cisco Technology, Inc., San Jose, CA (US)

(72) Inventors: Alberto Rodriguez Natal, Mountain View, CA (US); Marc Portoles Comeras, Mountain View, CA (US); Vina Ermagan, San Francisco, CA (US); Victor Moreno, Carlsbad, CA (US); Fabio Maino, Palo Alto, CA (US); Sanjay Hooda, Pleasanton, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/514,223

(22) Filed: Jul. 17, 2019

(51) Int. Cl.
  *H04L 12/715* (2013.01)
  *H04L 12/741* (2013.01)
  *H04L 12/733* (2013.01)

(52) U.S. Cl.
  CPC .............. *H04L 45/64* (2013.01); *H04L 45/04* (2013.01); *H04L 45/20* (2013.01); *H04L 45/745* (2013.01)

(58) Field of Classification Search
  None
  See application file for complete search history.

(56) References Cited

U.S. PATENT DOCUMENTS

| 8,107,484 B2* | 1/2012 | Xu | H04L 45/04 370/401 |
| 2008/0062891 A1* | 3/2008 | Van der Merwe | H04L 45/04 370/254 |
| 2011/0235545 A1* | 9/2011 | Subramanian | H04L 45/54 370/254 |

OTHER PUBLICATIONS

P. Francis et al., FIB Suppression with Virtual Aggregation draft-ietf-grow-va-02.txt, Mar. 8, 2010.
PCT Notification of Transmittal of the International Search Report and the Written Opinion of the International Searching Authority, or the Declaration, Int. Application PCT/US2020/040872, Sep. 17, 2020.

* cited by examiner

*Primary Examiner* — Hong S Cho
(74) *Attorney, Agent, or Firm* — Baker Botts, LLP

(57) ABSTRACT

In one embodiment, a router includes processors and computer-readable non-transitory storage media coupled to the processors including instructions executable by the processors. The router may store at least one virtual prefix and an associated aggregation threshold. The router may register, with a mapping database of an overlay network, ownership of individual prefixes served by the router. The router may determine an amount of prefixes served by the router that are within an address space of the virtual prefix. The router may register, based on a determination that the amount of prefixes satisfies the aggregation threshold, ownership of the virtual prefix with the mapping database of the overlay network. The registration of the virtual prefix may cause ownership of one or more of the registered individual prefixes served by the router that are within the address space of the virtual prefix to be deregistered.

20 Claims, 9 Drawing Sheets

SYSTEMS AND METHODS FOR VIRTUAL PREFIX AGGREGATION IN ON-DEMAND OVERLAY NETWORKS

TECHNICAL FIELD

This disclosure generally relates to providing access to computer networks.

BACKGROUND

Overlay networking is a technique for providing computer networking that uses software to create layers of network abstraction. The layers of network abstraction can be used to run virtualized network layers on top of a physical network. Overlays may be maintained by creating a connection between two endpoints of a network. Multiple secure overlays can be created, connecting multiple network endpoints, using primarily new software and existing networking hardware infrastructure. The endpoints of the network connected by overlays can be physical locations, such as a network port, or logical locations designated by a software address in the networking cloud. Communication between the endpoints of the network can be facilitated by addressing the communications to a network address associated with the endpoint. Overlay networks provide opportunities for new or widely used applications, security benefits, and other efficiencies.

DESCRIPTION OF EXAMPLE EMBODIMENTS

Overview

Figure 1:
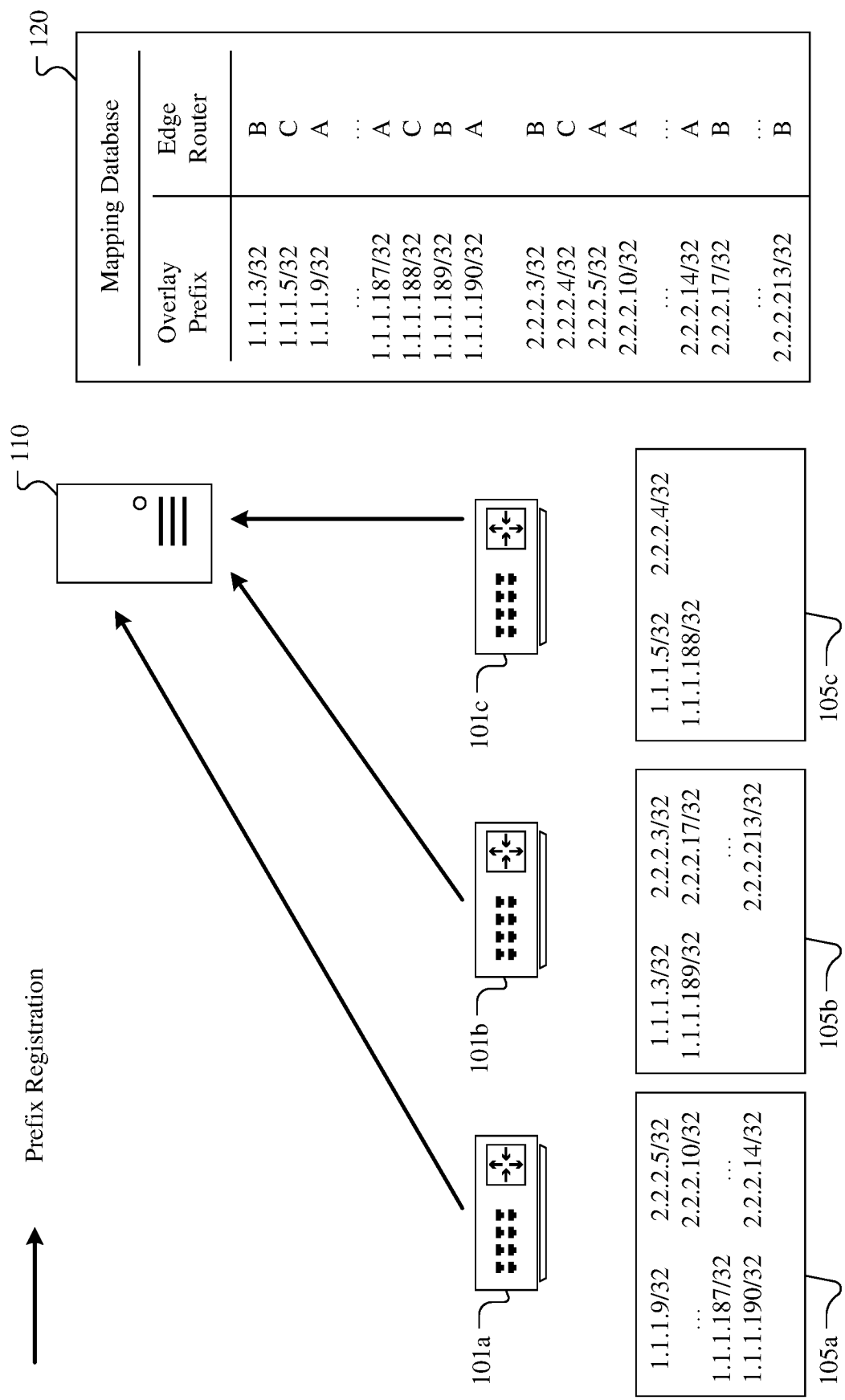
FIG. 1 illustrates an example network.

In particular embodiments, a router includes one or more processors and one or more computer-readable non-transitory storage media coupled to the one or more processors. The storage media may include instructions operable when executed by the one or more processors. When executed, the instructions may cause the router to store at least one virtual prefix and an associated aggregation threshold. The router may register, with a mapping database of an overlay network, ownership of individual prefixes served by the router. The router may determine an amount of prefixes served by the router that are within an address space of the virtual prefix. The router may register, based on a determination that the amount of prefixes satisfies the aggregation threshold, ownership of the virtual prefix with the mapping database of the overlay network. After registration of the virtual prefix, the router may stop registering one or more of the registered individual prefixes served by the router that are within the address space of the virtual prefix (e.g., that are less specific than the virtual prefix), effectively deregistering them.

In particular embodiments, a network controller includes one or more processors and one or more computer-readable non-transitory storage media coupled to the one or more processors. The storage media may include instructions operable when executed by the one or more processors. The instructions, when executed, may cause the network controller to access, from a mapping database in an overlay network, registrations of one or more individual prefixes by one or more routers in the overlay network. The network controller may determine, based on the accessed registrations, a virtual prefix available for registration by one or more routers in the overlay network, an aggregation threshold associated with the virtual prefix, and a virtual prefix length associated with the virtual prefix. Registering router may register ownership of the virtual prefix if an amount of prefixes within an address space of the virtual prefix served by the registering router satisfies the associated aggregation threshold. In registering ownership of the virtual prefix, ownership of one or more of the registered individual prefixes served by the registering router that are within the address space of the virtual prefix may be deregistered. The network controller may send the virtual prefix, the associated aggregation threshold, and the associated virtual prefix length to the routers in the overlay network.

EXAMPLE EMBODIMENTS

On-demand fabric networks may present benefit in terms of reduced state and signaling required on a network. In fabric networks, the underlying hardware making up the network operates on a separate configuration level from one or more overlay fabrics, which make up the components of the network that edge routers and devices connect to. In an on-demand fabric network, the configuration information (e.g., state) that must be managed by operators can be reduced, as much of it can be determined in real-time as end-points are added and removed from the network. The configuration information may be stored in and managed by a mapping database, which maps the assignment of overlay network prefixes to physical edge routers. The amount of signals required to maintain configuration and provide services can also be controlled through aggregation of network prefixes. These benefits are more prominent the more aggregated the prefixes on the overlay network are. Aggregated prefixes may arise where a single physical router is configured to serve a larger number of connected devices. This allows for communication directed to those devices to be routed more efficiently to the single physical router.

Networks with highly aggregated prefixes may allow for less state information to be stored in the overlay mapping database as compared to disaggregated networks. Relatedly, networks with highly aggregated prefixes may allow for less configuration communication and signaling between the devices to register the prefix to edge router mappings to the mapping database and subsequently retrieve the stored mappings.

Therefore, when an overlay deployment has a large number of disaggregated prefixes (e.g., deployments where host prefixes (/32) are predominant), the benefits of on-demand overlays cannot be maximized. In such deployments each host may be noted with an entry in the mapping database. Registration and maintenance of each mapping may be performed through a control message. Thus, in such situations, the benefits of on-demand overlays are not fully realized. In some deployments, such as those that must contend with highly mobile devices, host prefixes may be the norm or even the default case. A mechanism to dynamically aggregate disaggregated overlay prefixes would be an improvement to on-demand overlay networks, based on these challenges. By dynamically aggregating disaggregated overlay prefixes (e.g., in mobility-focused deployments), the state and signaling on the on-demand fabric may be greatly reduced.

To alleviate the state and signaling load in highly disaggregated on-demand overlay networks, this disclosure provides mechanisms to dynamically aggregate overlay prefixes in on-demand fabrics. According to the techniques described herein, on-demand overlay networks may dynamically determine where the majority of hosts in a prefix reside (e.g., which router serves the majority of hosts within an address space associated with the prefix) and register an aggregate prefix from that particular site as a "virtual prefix." This aggregation facilitates removal of granular state information for the many prefixes from the control plane, simplifying the data stored in the mapping database and reducing the control communication to maintain the overlay prefix to edge router assignment information.

A "virtual prefix" is a mechanism to aggregate disaggregated overlay prefixes. Virtual prefixes are less specific prefixes (e.g., with broader address spaces) that cover a group of disaggregated prefixes. Virtual prefixes may serve to optimize the state kept by an overlay mapping database for the network and reduce the communication to create and maintain that state. Using virtual prefixes, a given edge router with a specified concentration of disaggregated prefixes may register with the mapping database to claim "ownership" of a less specific, virtual prefix that covers many of these disaggregated prefixes. The edge router may register the less specific prefix rather than the disaggregated prefixes. As an example, consider an edge router serving 200 out of the 256 host prefixes (e.g., /32 prefixes) between 10.10.10.0 and 10.10.10.255. In standard operation, the edge router would register each of the 200 host prefixes with the overlay mapping database. Even with optimized communication allowing for several registrations to be submitted together, this may require dozens of individual registration signals. Using virtual prefixes, as described herein, the edge router may instead register only a single virtual prefix, e.g., 10.10.10.0/24, to optimize mapping database state management and configuration communication. In this example, the introduction of the virtual prefix may reduce the amount of entries generated by the edge router in the mapping database from 200 (e.g., for each host prefix served by the router) to 1 (e.g., the single virtual prefix). Similarly, populating these entries in the mapping database may require a single control message instead of dozens of messages.

When a virtual prefix is registered by an edge router, traffic for prefixes within that address space that are not specifically registered by another edge router is directed to the edge router to which the virtual prefix is registered. Registration of the ownership of the virtual prefix may cause traffic between one or more nodes (e.g., components) of the overlay network to be routed based on the virtual prefix. For example, network traffic directed to a network prefix not specifically registered to another node (e.g., another edge router) may be routed to the node (e.g., edge router) that has registered the virtual prefix.

FIG. 1 illustrates an example network in which host prefixes predominate. FIG. 1 illustrates three routers, 101*a*, 101*b*, and 101*c*. Each router serves a number of host prefixes within the 1.1.1.0/24 and 2.2.2.0/24 address spaces. The specific host prefixes served by each router 101*a-c* are shown in the accompanying table 105*a-c*, respectively. Router 101*a*, as shown in table 105*a*, serves 186 host prefixes: 1.1.1.9/32-1.1.1.187/32, 1.1.1.190/32, 2.2.2.5/32, and 2.2.2.10/32-2.2.2.14/32. Router 101*b*, as shown in table 105*b*, serves 200 host prefixes: 1.1.1.3/32, 1.1.1.189/32, 2.2.2.3/32, and 2.2.2.17/32-2.2.2.213/32. Router 101*c*, as shown in table 105*c*, serves 3 host prefixes: 1.1.1.5/32, 1.1.1.188/32, and 2.2.2.4/32. As indicated by the arrows connecting each of routers 101*a-c* to the mapping database 110, each router registers ownership of the host prefixes it serves to the mapping database 110. Thus, the mapping database state, shown in table 120, comprises 389 individual mappings of a prefix to edge router (identifying edge routers 101*a*, 101*b*, and 101*c* as Edge Router A, B, and C, respectively). Although not shown, routers 101*a* and 101*b* may send a plurality of configuration communications to perform the registration.

In furtherance of facilitating the use of virtual prefixes, this disclosure defines several parameters which may be provided to edge routers or the mapping database (e.g., during configuration or management by the network administrator) or, and as discussed below, may be dynamically determined during network operations.

In particular embodiments, the virtual prefixes that are eligible for registration must be identified. An edge router must be aware of the virtual prefix, and its associated address space, to determine whether it is serving a large enough proportion of the addresses within the address space to claim ownership of the virtual prefix. Several factors may be considered when determining the virtual prefixes and associated address spaces. In particular embodiments, the virtual prefix may be selected such that it does not match an overlay prefix already being served by an edge router in the fabric. Thus, the virtual prefix should not be a duplicate of an active overlay prefix to avoid routing conflicts. In particular embodiments, the specificity and breadth of the address space for a virtual prefix (e.g., the number of prefixes encompassed by the address space) may be selected to reduce the risk of conflicting prefixes. For example, a more specific address space for a virtual prefix may be selected based on one or more other prefixes registered to another edge router, when the other prefixes may be encompassed by a less specific address space for the same virtual prefix.

In particular embodiments, an aggregation threshold for the virtual prefix may be determined. An aggregation threshold may be a threshold number or proportion of prefixes within an address space associated with a virtual prefix served by an edge router that the edge router must satisfy before it may register a claim to ownership of the virtual prefix. In this context, registering or claiming ownership of the virtual prefix may mean that the edge router is permitted to register the virtual prefix with the overlay mapping database and that data intended for the prefixes within that address space may be served to that edge router.

In particular embodiments, a de-aggregation threshold for the virtual prefix may be determined. A de-aggregation threshold may be a threshold number or proportion of prefixes within an address space associated with a virtual prefix owned by an edge router that the edge router must satisfy before the edge router may unregister its claim to ownership. In particular embodiments, the de-aggregation threshold may be lower than the aggregation threshold. The de-aggregation threshold may be a lower threshold on the number or proportion of prefixes within an address space served by the edge router which, if the edge router fails to satisfy that number, the edge router may no longer claim ownership of the virtual prefix.

The number of prefixes within a virtual prefix served by the edge router may change as the number of devices connected through the edge router fluctuates (e.g., through movement, disconnection, power cycling, etc.). The number of prefixes may thus increment or decrement over time. As a result of decrements, an updated amount of prefixes served by an edge router may fall below the threshold and lose authority to claim ownership of the virtual prefix. In particular embodiments, deregistering or disowning a virtual prefix may be the result of an affirmative step taken by the edge router. In some embodiments, it may be desirable to expressly remove the virtual prefix registration. In practice, the edge router may be configured to send a message to the mapping database as soon as it detects that it should no longer have ownership of the virtual prefix (e.g., when it fails to satisfy the de-aggregation threshold).

In particular embodiments, the ownership of a virtual prefix by an edge router may be removed from the edge router naturally. As explained below, in certain configurations, after a first edge router claims ownership of a virtual prefix, it will not be possible for a second edge router to claim ownership unless the first edge router has failed to satisfy the de-aggregation threshold. Thus, the ownership of the virtual prefix may be passed to the second edge router without risk of conflict. As a result of losing ownership of the virtual prefix, the edge router may be configured to stop registering the virtual prefix and instead register the de-aggregated entries that it is serving.

As an example, an edge router may be configured with the virtual prefix 192.168.1.0/24 and the corresponding address space. The edge router may be configured with, and store, an 80% aggregation threshold for the virtual prefix 192.168.1.0/24 and a 30% de-aggregation threshold. For this example, the edge router may be configured to serve host routes (/32 prefixes). The edge router may be configured to serve any suitable routes. At a first time, the edge router may determine that it is serving 38 of the prefixes (~15%) within the 192.168.1.0/24 virtual prefix address space. Because the edge router does not satisfy the requirements of the aggregation threshold, it must register each host prefix in a mapping database for the network as an independent entity through one or more configuration communication signals. The number of prefixes within the 192.168.1.0/24 virtual prefix address space served by the edge router may increment and, at a second time, the edge router may determine that it is serving 217 of the prefixes (~85%) within the 192.168.1.0/24 virtual prefix address space. The edge router may cease registering the host routes it is serving with the mapping database and may instead register ownership of the virtual prefix 192.168.1.0/24. The edge router may do this with a single configuration communication signal. The number of prefixes within the 192.168.1.0/24 virtual prefix address space served by the edge router may decrement and, at a third time, the edge router may determine an updated amount of prefixes that it is serving. For example, the edge router may determine that it is now serving 64 of the prefixes (25%) within the 192.168.1.0/24 virtual prefix address space. The edge router may deregister ownership of the virtual prefix 192.168.1.0/24 with the mapping database and may instead register ownership of each of the dis-aggregated host prefixes. The edge router may do this with one or more configuration communication signals.

In particular embodiments, the combination of the aggregation thresholds and de-aggregation thresholds may provide a network system with a hysteresis to prevent instability when the distribution of the prefixes oscillates around a particular percentage of the virtual prefix address space. It may be feasible for an embodiment to make the hysteresis window zero by setting the aggregation thresholds and de-aggregation thresholds the same. However, in particular embodiments, this may introduce a degree of instability.

In particular embodiments, the aggregation thresholds and de-aggregation thresholds may be used to avoid ripple effects that may occur with use of only a single threshold (e.g., an aggregation threshold only). For example, the address space served by an edge router may be fairly dynamic, with many devices being added to or removed from the edge router over time. This may cause the value to hover close to the aggregation threshold. This may increase the communication required to maintain the virtual prefix registration because the router may send otherwise unnecessary registration and deregistration notices. For example, with an aggregation threshold of 51%, if the host prefixes served by a particular edge router varies by 2% (e.g., between 50% and 51%), but does so repeatedly. The amount of communication required for network configuration may be unnecessarily increased.

Figure 2:
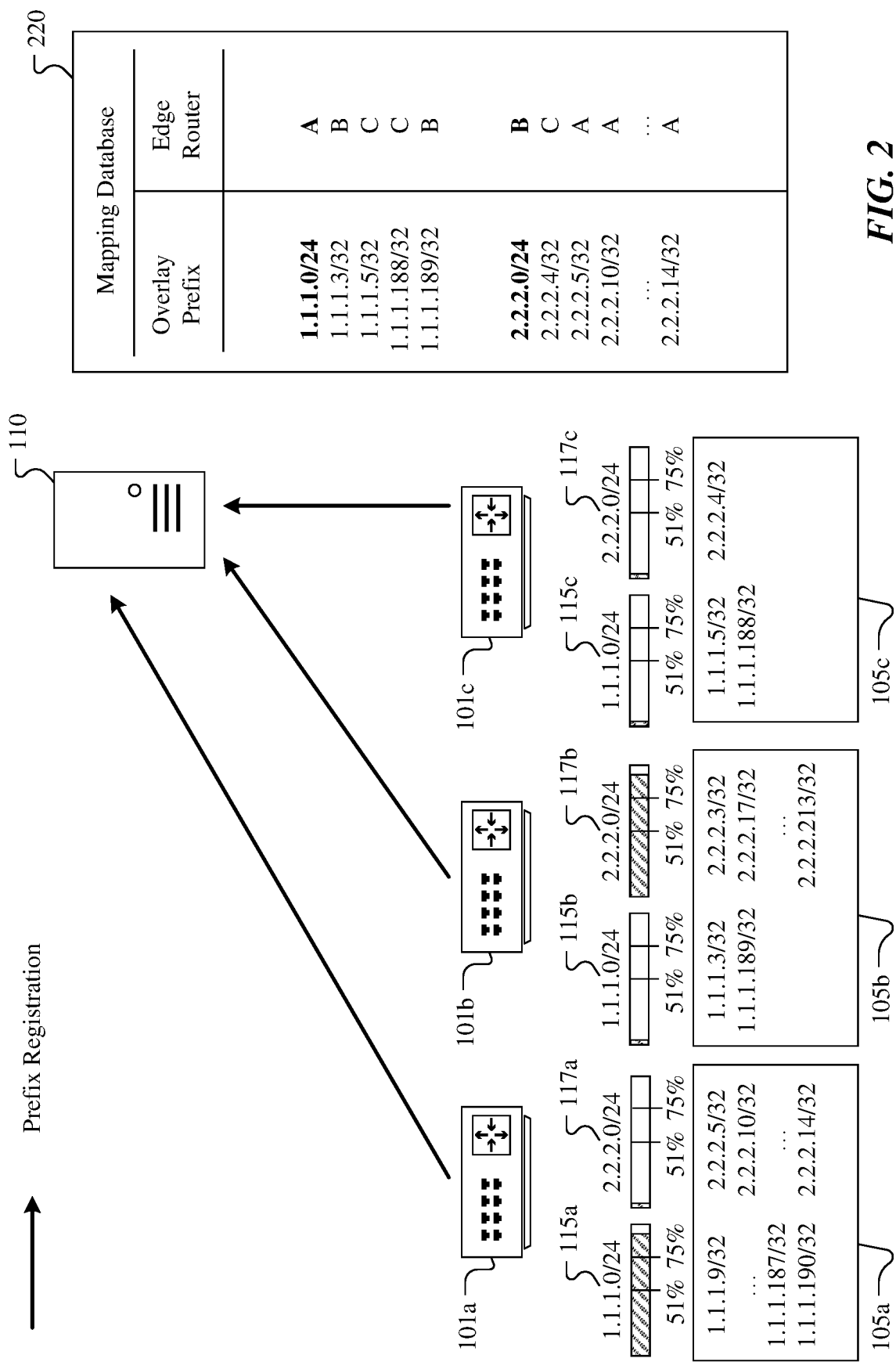
FIG. 2 illustrates an example network with a distributed virtual prefix mechanism.

FIG. 2 illustrates an example network operating with a virtual prefix mechanism. The network in FIG. 2 is based on the network shown in FIG. 1. FIG. 2 illustrates three routers, 101a, 101b, and 101c that serve a number of host prefixes within the 1.1.1.0/24 and 2.2.2.0/24 address spaces. The specific host prefixes served by each router 101a-c, which had previously been registered with the mapping database 110 are shown in the accompanying table 105a-c, respectively. In the network in FIG. 2, the routers 101a-c have been configured to use the virtual prefixes 1.1.1.0/24 and 2.2.2.0/24. The routers 101a-c have been configured to use an aggregation threshold of 75% and a de-aggregation threshold of 51% for each virtual prefix. The graphic 115a shows the approximate percentage of the address space for the virtual prefix 1.1.1.0/24 served by the router 101a, based on the host prefixes recited in table 105a. The graphic 117a shows the approximate percentage of the address space for the virtual prefix 2.2.2.0/24 served by the router 101a, based on the host prefixes recited in table 105a. The graphic 115b shows the approximate percentage of the address space for the virtual prefix 1.1.1.0/24 served by the router 101b, based on the host prefixes recited in table 105b. The graphic 117b shows the approximate percentage of the address space for the virtual prefix 2.2.2.0/24 served by the router 101b, based on the host prefixes recited in table 105b. The graphic 115c shows the approximate percentage of the address space for the virtual prefix 1.1.1.0/24 served by the router 101c, based on the host prefixes recited in table 105c. The graphic 117c shows the approximate percentage of the address space for the virtual prefix 2.2.2.0/24 served by the router 101c, based on the host prefixes recited in table 105c. As shown in the graphic 115a, router 101a serves enough host prefixes within the 1.1.1.0/24 virtual prefix address space to satisfy the aggregation threshold of 75% for the 1.1.1.0/24 virtual prefix. As shown in the graphic 117b, router 101b serves enough host prefixes within the 2.2.2.0/24 virtual prefix address space to satisfy the aggregation threshold of 75% for the 2.2.2.0/24 virtual prefix. Router 101c does not satisfy any aggregation thresholds.

After determining that they satisfy the aggregation thresholds, routers 101a and 101b may register ownership of the respective virtual prefixes with the mapping database 110. Registering ownership of the respective virtual prefixes with the mapping database 110 may cause the mapping database 110 to deregister previously registered individual prefixes served by a router within the address space of the virtual prefix. As shown in the table 220, the network state records maintained by the mapping database 110 may be greatly simplified compared to the mapping database records shown in table 120 of FIG. 1. The table 220 indicates that the virtual prefix 1.1.1.0/24 is registered by router 101*a* (identified as Edge Router A). The table 220 further indicates that the virtual prefix 2.2.2.0/24 is registered by router 101*b* (identified as Edge Router B). The table 220 further indicates the remaining host prefixes served by the routers 101*a-c* that are not covered by the registration of a virtual prefix. As shown in table 220, the introduction of virtual prefixes reduces the number of entries registered with the mapping database 110 from 389 entries (as shown in FIG. 1) to 13 entries. This may reduce the state configuration and configuration communication messaging required in the fabric network.

In particular embodiments, the virtual prefix mechanism does not impose that the more specific prefixes covered by the virtual prefix to be host routes. As an example, if the edge router from the example above is serving 192.168.1.0/25, 192.168.1.128/26 and 192.168.1.192/32, it may instead register 192.168.1.0/24 since it would be serving more than the 75% of the address space covered by the 192.168.1.0/24 virtual prefix. In particular embodiments, the virtual prefix mechanism may be applied recursively. For example, a particular edge router may store two virtual prefixes. The first virtual prefix may be entirely within the second virtual prefix—the first virtual prefix may have a more specific address space than the second virtual prefix. It may also be possible to permit different aggregation thresholds or de-aggregation thresholds for each virtual prefix or recursive virtual prefixes. The edge router may satisfy the aggregation threshold for the first virtual prefix at a first time, at which point the edge router may register the first virtual prefix. At a second time, the edge router may satisfy the aggregation threshold for the second virtual prefix as well. The edge router may register ownership of the second virtual prefix, which may cause the first virtual prefix to be deregistered. Due to the address space overlap, the edge router may still serve the addresses encompassed by the first virtual prefix, as it is contained within the second virtual prefix.

A variety of mechanisms may be used to determine the values for virtual prefixes, aggregation thresholds, de-aggregation thresholds, and prefix lengths. In particular embodiments, the virtual prefixes may be selected such that they do not collide or interfere with any actual prefix being served in the overlay network. This may be to prevent a virtual prefix from overwriting the mapping for an actual prefix being served by an edge router. In some cases, only a subset of the edge routers in an overlay network may be configured with a virtual prefix mechanism, so that some of the edge router may even be unaware of the virtual prefix mechanism. In particular embodiments, to prevent collisions, it may be advantageous to select the virtual prefixes from those prefixes that are not being served by the overlay network. In particular embodiments, it may also be possible to select virtual prefix lengths (e.g., the breadth of the address space served by the associated with the virtual prefix) in place of, or in addition to, selecting specific virtual prefixes. The virtual prefix selection mechanism may also prevent two different edge routers from registering the same virtual prefix at the same time. In some embodiments, simultaneous registration is strictly prohibited.

It should be appreciated that the mechanisms described in this disclosure have implications with respect to the data-plane of the fabric overlay network. For example, one impact relates to the aggregation thresholds, de-aggregation thresholds, and prefix lengths selected. In particular embodiments, the edge router registering the virtual prefix will attract the traffic for the so-called "gaps" in the virtual prefix address space—parts of the address space that no edge router is actually serving. In the absence of a specific entry on the mapping database, this traffic may be dropped or forwarded to a default destination in a network not employing the virtual prefix mechanisms described herein. If the destination for the traffic is now covered by a virtual prefix the traffic may now be forwarded to the edge router registering the virtual prefix. Although this may impact traffic on the network slightly, it is expected that the impact will be minimal. For example, most of the address space covered by a virtual prefix may be assumed to already be served by the edge router registering the virtual prefix so the described optimizations will attract little extra traffic. As another example, the traffic addressed to gaps within virtual prefixes may be assumed to be negligible as in an enterprise network is not common to see legitimate traffic going to non-existent host routes (/32 prefixes) within the address space of an enterprise.

For at least these reasons, the virtual prefixes, aggregation threshold, de-aggregation thresholds, and prefix lengths should be carefully selected (e.g., by network operators) based on the particularities of their particular deployments. This disclosure proposes at least two example mechanisms through which overlay edge routers can be provisioned with virtual prefixes, aggregation thresholds, de-aggregation thresholds, and prefix lengths to use. A first mechanism may be referred to as a distributed or decentralized approach. A second mechanism may be referred to as a centralized approach. Each mechanism provides networks and network operators with different degrees of freedom on viable virtual prefixes, aggregation thresholds, de-aggregation thresholds, and prefix lengths.

In the distributed approach, it is assumed that individual edge routers do not coordinate with a centralized entity (e.g., mapping database 110) or with other overlay edge routers (e.g., routers 101*a*-101*c*). In particular embodiments, the edge routers may be pre-assigned with a set of virtual prefixes, virtual prefix lengths, address spaces, aggregation thresholds, or de-aggregation thresholds. Pre-assigning or provisioning an edge router with the set of virtual prefixes and associated information may cause the edge router to store the virtual prefixes and other information for later use. The provisioned set may be selected by a network operator according to the particular characteristics of the network. Importantly, the mechanisms described herein do not mandate any particular set of virtual prefixes or prefix lengths. As an example, for an example deployment a network operator may select 10.0.0.0/8 and 192.168.1.0/24 as the virtual prefixes to use, specifying both the virtual prefixes and prefix lengths. As another example, for an example deployment the network operator may define that the virtual prefix length is/16 without the need to define any specific virtual prefixes. The edge routers may be configured to determine the appropriate virtual prefixes to use by, for example, determining when the router serves an amount of prefixes within an address space of the specified virtual prefix length (/16) above an aggregation threshold.

In particular embodiments, because no coordination is assumed in the distributed case, the de-aggregation threshold value may be selected such that it prevents two different edge routers from claiming ownership of the same virtual prefix at the same time (e.g., two edge routers claiming ownership of the virtual prefix 1.1.1.0/24). In some embodiments, the de-aggregation threshold value must be selected to prevent competing ownership claims. In other words, the de-aggregation threshold must be selected such that an edge router will register the de-aggregated version of a virtual prefix rather than risk registering a virtual prefix that may be registered by another edge router. As an example, assume a network with two edge routers configured with a distributed virtual prefix mechanism. Assume also that an aggregation threshold is set to 55% and a de-aggregation threshold is set to 40%. The first edge router may, at a first time, serve 65% of the prefixes with the address space of a virtual prefix (meaning the second edge router may, at most, serve 35%). The first edge router may claim ownership of the virtual prefix. At a second time, as host prefixes shift, the second edge router may detect that it is serving 60% of the prefixes within the address space of the virtual prefix. Following the aggregation threshold, it my attempt to claim ownership. However, the first edge router may still be serving up to 40% of the prefixes and may not have deregistered ownership of the virtual prefix. Thus, a conflict may arise because of the selection of aggregation thresholds, de-aggregation thresholds, and prefix lengths.

To reduce the chance of conflicts, a de-aggregation threshold for the distributed case must be selected to be greater than or equal to 51% of the address space covered by a particular virtual prefix. The fixed value of 51% (or more) breaks any ties between edge routers and ensures that a single overlay edge router can claim a given virtual prefix at a given time. In the example above, when the second edge router detects that it is serves 60% of the prefixes in the address space, the first edge router can at most be serving 40% of the prefixes of the address space. Thus, the first edge router will have deregistered ownership of the virtual prefix at some point in time between the first time and the second time. The second edge router may then safely claim ownership of the virtual prefix. Note that there may not be additional specific requirements for the aggregation threshold, other than that it must be greater than the de-aggregation threshold. The particular choice of an aggregation threshold may depend on the particular network characteristics such as the propensity for aggregation, mobility, physical dispersion of the network, and any other suitable characteristics.

When the distributed approach is used, the virtual prefix aggregation mechanism may be transparent for the mapping database—the mapping database may be agnostic to the operation of the virtual prefix aggregation mechanism. The logic and configurations for the virtual prefix mechanism may be implemented and executed at the edge routers without any additional support from the mapping database. FIG. 2, described above, shows an example of the distributed approach where the virtual prefixes, aggregation thresholds, de-aggregation thresholds, and prefix lengths are directly configured in the edge routers (for example, by the network operation during configuration).

Figure 3:
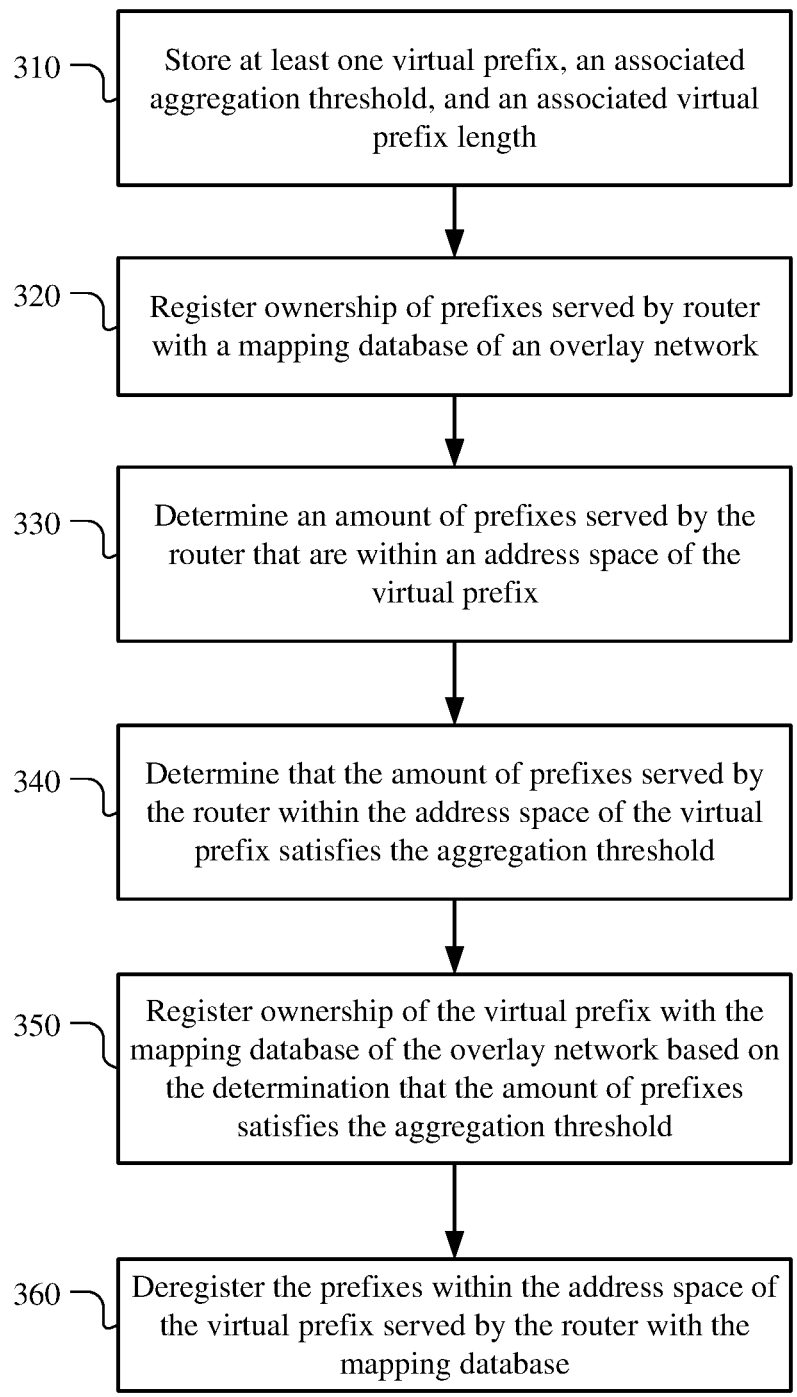
FIG. 3 illustrates an example method for registering a virtual prefix.

FIG. 3 illustrates an example method 300 for registering a virtual prefix with a distributed mechanism. The method may begin at step 310 where a router may store at least one virtual prefix, an associated aggregation threshold, and an associated virtual prefix length for use. As described above, the virtual prefix, associated aggregation threshold, and associated virtual prefix length may be received from a network operator or another component of the network. In particular embodiments, the edge router may have been configured with the virtual prefix, the address space for the virtual prefix, or the aggregation threshold. At step 320, the router may register ownership of individual prefixes (e.g., host prefixes, network prefixes, virtual prefixes, etc.) served by the router with a mapping database of an on-demand overlay network. The router may be a component in an on-demand overlay network, serving one or more prefixes. To facilitate operation of the on-demand overlay network, the router may register ownership of those prefixes, indicating that traffic directed to a prefix registered as owned by the prefix should be directed to the router. At step 330, the router determines an amount of prefixes served by the router that are within an address space of one or more of the virtual prefixes stored and used by the router. At step 340, the router may determine that the amount of prefixes served by the router within the address space of the virtual prefix satisfies the aggregation threshold. At step 350, the router may register ownership of the virtual prefix with the mapping database of the overlay network in which the edge router operates based on the determination that the amount of prefixes served by the router satisfies the aggregation threshold. The edge router may send one or more configuration communication messages or signals to the mapping database indicating that it requests ownership of the virtual prefix. In particular embodiments, the edge router may simply register the virtual prefix as it would any other prefix, without informing the mapping database that it is a virtual prefix. In particular embodiments, at step 360, the router may deregister, with the mapping database, the individual prefixes within the address space of the virtual prefix that had been registered by the router. The edge router may actively request to deregister the addresses. In particular embodiments, registering ownership of the virtual prefix with the mapping database may cause the mapping database to perform the deregistration process for those prefixes.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for dynamically resolving prefix overlap conflicts including the particular steps of the method of FIG. 3, this disclosure contemplates any suitable method for dynamically resolving prefix overlap conflicts including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

In the centralized approach, a centralized entity may determine the virtual prefixes, aggregation thresholds, de-aggregation thresholds, and prefix lengths to be used by the network. The centralized entity may be a mapping database (or database system), a network controller, a deployment orchestrator, or any other suitable component of the system. For the centralized approach, the centralized entity may have access to pertinent network information, as is the case with the overlay mapping database. With this information, the centralized entity may dynamically compute virtual prefixes, aggregation thresholds, de-aggregation thresholds, and prefix lengths. Using the centralized view of the network, the computed values may be chosen to be the most appropriate for the particular state of the network at a given point in time. Thus, the configuration parameters chosen may change over time as the state of the network develops.

Figure 4:
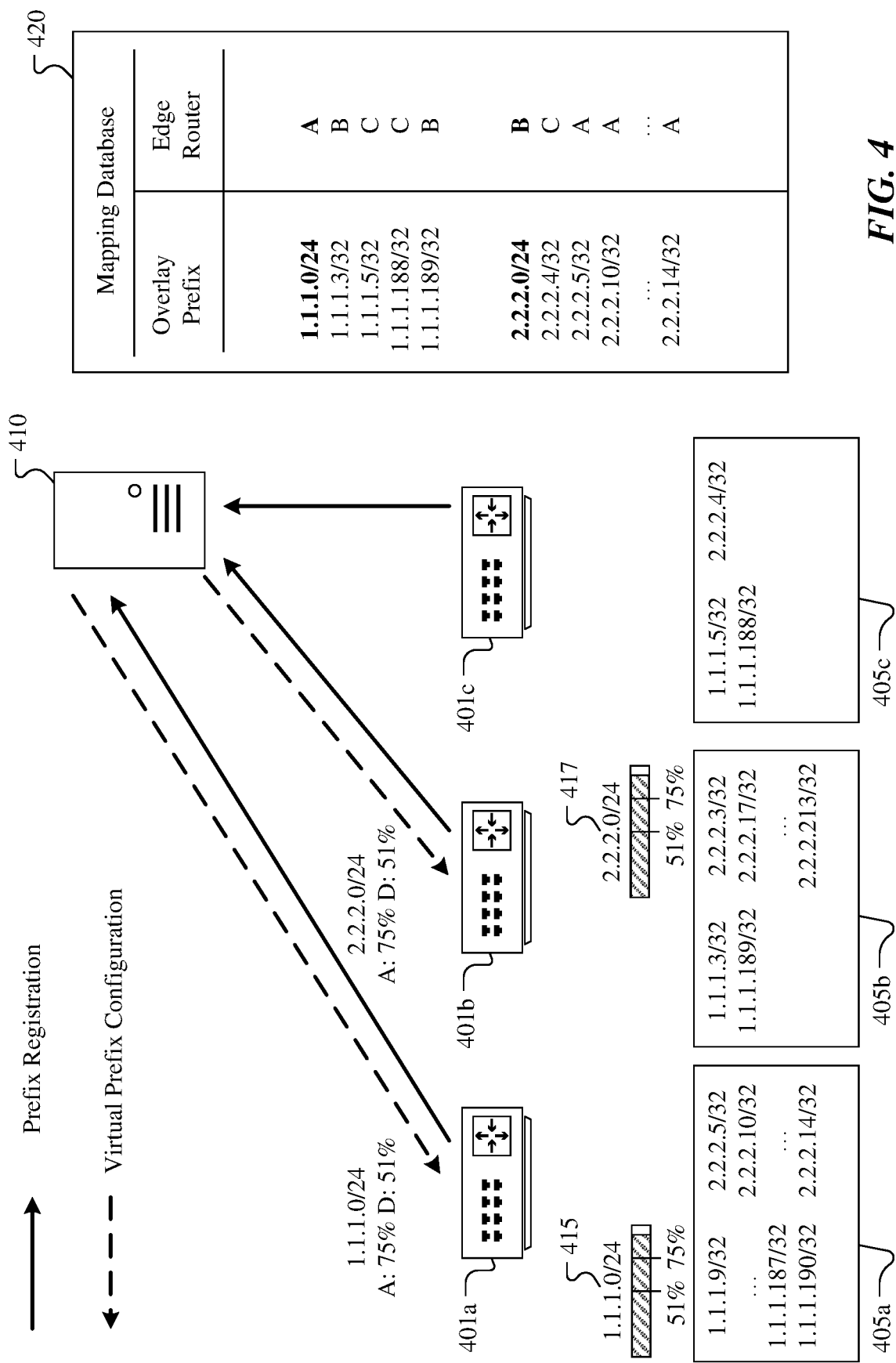
FIG. 4 illustrates an example network with a centralized virtual prefix mechanism.

FIG. 4 illustrates an example network in which a virtual prefix mechanism operates with a more centralized approach. FIG. 4 illustrates three routers, 401a, 401b, and 401c. Each router serves a number of host prefixes within the 1.1.1.0/24 and 2.2.2.0/24 address spaces. The specific host prefixes served by each router 401a-c are shown in the accompanying table 405a-c, respectively. Router 401a, as shown in table 405a, serves 186 host prefixes: 1.1.1.9/32-1.1.1.187/32, 1.1.1.190/32, 2.2.2.5/32, and 2.2.2.10/32-2.2.2.14/32. Router 401b, as shown in table 405b, serves 200 host prefixes: 1.1.1.3/32, 1.1.1.189/32, 2.2.2.3/32, and 2.2.2.17/32-2.2.2.213/32. Router 401c, as shown in table 405c, serves 4 host prefixes: 1.1.1.5/32, 1.1.1.188/32, and 2.2.2.4/32. As indicated by the arrows connecting each of routers 401a-c to the mapping database 410, each router registers the host prefixes it serves to the mapping database 410.

In the network illustrated in FIG. 4, the mapping database 410 (or other centralized entity, e.g., a network controller) determines the virtual prefixes to use, as well as the aggregation thresholds, de-aggregation thresholds, and prefix lengths based on the state of the network at a given time. Analyzing the prefixes served by the routers 401a and 401b, based on the configuration communications sent from the routers 401a-c (shown as the solid lines connecting the routers 401a-c to the mapping database 410), the mapping database 410 decides to configure virtual prefixes for routers 401a and 401b. In particular, the mapping database 410 selects virtual prefix 1.1.1.0/24 for router 401a and 2.2.2.0/24 for router 401b. The mapping database 410 further determines to use an aggregation threshold of 75% and a de-aggregation threshold of 51% for both virtual prefixes. In the example illustrated in FIG. 4, the mapping database sends the appropriate configuration information (e.g., virtual prefix, aggregation threshold, and de-aggregation threshold) to the routers 401a and 401b (as shown by the dashed lines from the mapping database 410 to the edge routers 401a and 401b). In particular embodiments, the mapping database may not send the configuration information to the edge routers and instead may manage the effects of the virtual prefix mechanism, handling registration and deregistration itself.

In particular embodiments, the mapping database may determine the virtual prefix, aggregation thresholds, de-aggregation thresholds, prefix lengths, and other information, and send that information to the routers. Each router may individually determine whether it serves enough prefixes within the address space of each virtual prefix received from the mapping database to satisfy the aggregation threshold. The router may request to register and deregister prefixes and virtual prefixes in a manner similar to the mechanisms described above with respect to FIG. 2. For example, the network controller may receive a notification from the router indicating that it satisfies the aggregation threshold (or later, the de-aggregation threshold).

Based on the configuration information, the routers 401a and 401b have been configured with the virtual prefixes 1.1.1.0/24 and 2.2.2.0/24, respectively. The routers 401a and 401b have been configured with an aggregation threshold of 75% and a de-aggregation threshold of 51% for their respective virtual prefixes. The graphic 415 shows the approximate percentage of the address space for the virtual prefix 1.1.1.0/24 served by the router 401a, based on the host prefixes recited in table 405a. The graphic 417 shows the approximate percentage of the address space for the virtual prefix 2.2.2.0/24 served by the router 401b, based on the host prefixes recited in table 405b. As shown in the graphic 415, router 401a serves enough host prefixes within the 1.1.1.0/24 virtual prefix address space to satisfy the aggregation threshold of 75% for the 1.1.1.0/24 virtual prefix. As shown in the graphic 417, router 401b serves enough host prefixes within the 2.2.2.0/24 virtual prefix address space to satisfy the aggregation threshold of 75% for the 2.2.2.0/24 virtual prefix. Router 401c does not satisfy any aggregation thresholds, as determined by the mapping database 410, and thus has not been configured with information about a virtual prefix.

The virtual prefixes 1.1.1.0/24 and 2.2.2.0/24 have been registered by edge routers 401a and 401b respectively in the mapping database 410, as shown in the table 420. As shown in the table 420, the network state records maintained by the mapping database 410 may be greatly simplified compared to the mapping database records shown in table 120 of FIG. 1. The table 420 indicates that the virtual prefix 1.1.1.0/24 is registered by router 401a (identified as Edge Router A). The table 420 further indicates that the virtual prefix 2.2.2.0/24 is registered by router 401b (identified as Edge Router B). The table 220 further indicates the remaining host prefixes served by the routers 401a-c that are not covered by the registration of a virtual prefix. As shown in table 420, the introduction of virtual prefixes reduces the number of entries registered with the mapping database 410 from 389 entries (as shown in FIG. 1) to 13 entries. This may reduce the state configuration and configuration communication messaging required in the fabric network.

In particular embodiments, a variety of techniques may be used to determine the virtual prefix, aggregation threshold, and de-aggregation threshold values for a network. In an embodiment, the centralized entity (e.g., network controller or mapping database 410) may rely on a similar approach to the one described above with respect to the distributed case. A network operator may configure the centralized entity with a configuration values, perhaps determined from operational experience, that the centralized entity may use (either directly or as reference starting point) when configuring the values at the edge routers. In another embodiment, a heuristic approach could be used where the centralized entity iterates and refines the values configured at the edge routers based on the resultant state of the network observed over time. For example, the centralized entity may assign or provision a virtual prefix and associated prefix length for one or more routers of the overlay network. The centralized entity may determine an effect of the assigned virtual prefix and associated address space on the network. The centralized entity may revise the virtual prefix or associated address space for one or more routers of the overlay network based on the determined effect. The centralized entity may perform this approach using batches of one or more virtual prefixes.

Upon determination of the virtual prefixes, aggregation thresholds, de-aggregation thresholds, and prefix lengths, the centralized entity may then distribute the configuration information to the overlay edge routers. As the network operates, if a network state change (e.g., after the virtual prefixes and thresholds have been distributed) indicates that other values should be used, the centralized entity may send updated virtual prefixes, aggregation thresholds, de-aggregation thresholds, and prefix lengths to the edge routers as appropriate.

In particular embodiments, with the centralized approach, de-aggregation thresholds lower than 51% can be used. The centralized entity monitors the virtual prefixes assigned to each edge router and may be configured to prevent conflicts that would otherwise be caused by edge routers claiming ownership of the same virtual prefixes. Thus, the centralized entity may be able to safely choose lower values. The centralized entity may use other heuristics to determine which edge router should be given permission to claim ownership. For example, the centralized entity may prefer stability—giving the edge router with the oldest claim to ownership priority, the centralized entity may prefer freshness—giving the edge router with the newest claim to ownership priority, the centralized entity may give the edge router serving the most prefixes within the virtual prefix address space priority, or the centralized entity may use location data associated with the edge routers. The centralized entity may use any other suitable heuristics or any combination thereof.

As an example, assume a network with a centralized virtual prefix mechanism and two edge routers. Assume also that an aggregation threshold is set to 55% and a de-aggregation threshold is set to 40%. The first edge router may, at a first time, serve 65% of the prefixes with the address space of a virtual prefix (meaning the second edge router may, at most, serve 35%). The centralized entity, identifying this, may configure the first edge router to claim ownership of the virtual prefix. At a second time, as host prefixes shift, the mapping database may detect that the second edge router is serving 55% of the prefixes within the address space of the virtual prefix. However, the first edge router is still serving 35% of the prefixes. Detecting a potential conflict, which would be caused by the second edge router claiming ownership of the virtual prefix, the centralized entity may use one or more heuristics to determine that the first edge router should be given priority and be allowed to continue to claim ownership of the virtual prefix. Thus, a conflict has been avoided.

Figure 5:
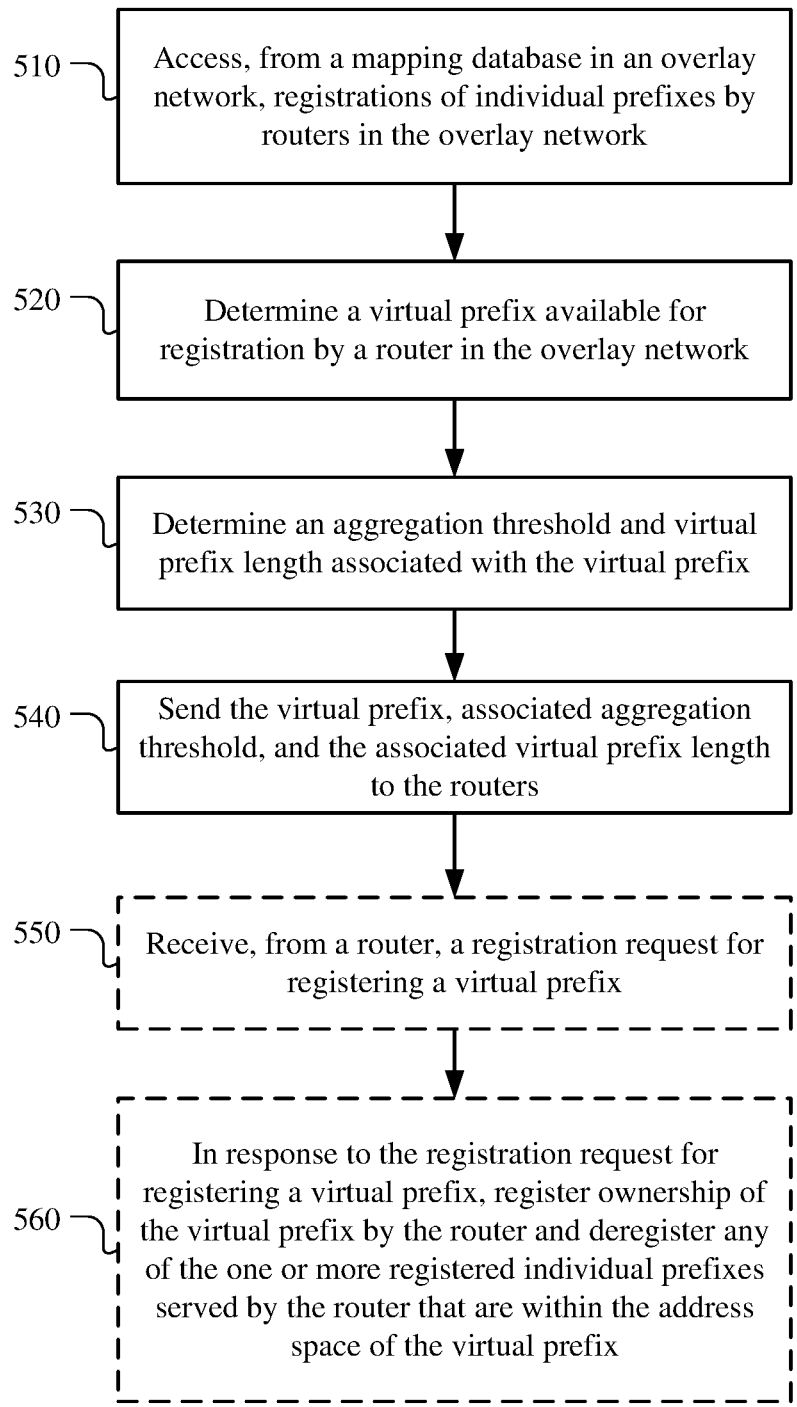
FIG. 5 illustrates an example method for registering a virtual prefix.

FIG. 5 illustrates an example method 500 for registering a virtual prefix with a centralized mechanism. The method may begin at step 510 where a network controller may access registrations of individual prefixes (e.g., host prefixes, network prefixes, virtual prefixes, etc.) by one or more routers in an overlay network. The network controller may access the registrations from a mapping database in the overlay network. In particular embodiments, the mapping database may itself perform the operations of described with reference to the network controller. At step 520, the network controller may determine a virtual prefix available for registration by one or more of the routers in the overlay network. In particular embodiments, the determination may be based on the current network status as reflected by the accessed registrations. At step 530, the network controller may determine a virtual prefix length associated with the virtual prefix and an aggregation threshold associated with the virtual prefix. As with the virtual prefix, in particular embodiments, the virtual prefix length and the aggregation threshold may be determined based on the current network status, and any other suitable information. A router in the overlay network may be configured to register ownership of the virtual prefix only if an amount of prefixes with an address space of the virtual prefix served by the registering router satisfies the associated aggregation threshold. In particular embodiments, registering ownership of the virtual prefix ownership of the registered individual prefixes served by the registering router that are within the address space of the virtual prefix to be deregistered. At 540, the network controller may send the virtual prefix, associated aggregation threshold, and associated virtual prefix length to the one or more routers in the overlay network. In some embodiments, the network controller may be configured stop executing the method after step 540. In some embodiments, the method may include one or more additional, optional steps as indicated by the dashed lines. At step 550, the network controller may receive, from a registering router, a registration request for registering a virtual prefix. As discussed previously, the registering router may determine that it satisfies the requirements relating to the aggregation threshold. At step 560, in response to the receiving the registration request for registering the virtual prefix, the network controller may register ownership of the virtual prefix by the router and may further deregister any of the one or more registered individual prefixes served by the router that are within the address space of the virtual prefix. As an example, the network controller may maintain or control a mapping database comprising assignments of various prefixes to the routers of the overlay network. In particular embodiments, the registration of ownership of a virtual prefix may comprise additional information when compared to the registration of a non-virtual prefix. The network controller may only deregister those individual prefixes that were registered to the router at the time the registration request for registering the virtual prefix is received. The network controller or the mapping database may clean up the data store maintained or controlled by the network controller to remove mappings that are no longer necessary, as the enforcement of the virtual prefix will enable the necessary routings. The edge router may actively request to deregister ownership of the prefixes, or the network controller may automatically perform the deregistration of ownership of the prefixes when the virtual prefix is registered to the edge router.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for dynamically resolving prefix overlap conflicts including the particular steps of the method of FIG. 5, this disclosure contemplates any suitable method for dynamically resolving prefix overlap conflicts including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

In particular embodiments, the virtual prefix mechanism may result in prefix overlap across edge routers. This may be in addition to overlaps that may exist across actual overlay prefixes that the edge routers are serving. To address the issue of overlapping prefixes in the fabric, a protocol for dynamic overlap conflict resolution may be used to resolve overlapping prefixes.

In particular embodiments, an edge router may ensure that it is registering the appropriate prefixes so any possible overlapping conflicts with other edge routers are resolved. The protocol described below allows the edge router to register the minimal information for operation. Following the protocol, the edge router then reacts to responses from a mapping database. The mapping database may dynamically notify the edge router of overlapping prefixes registered by other edge routers. The edge router then re-evaluates the prefixes it is registering and adjusts the information it is sending to the mapping database on demand. This protocol reduces the state and configuration communication messaging to address overlapping prefixes while still ensuring that the edge router attracts the correct traffic going to the prefixes that is serving and that is more specific than another overlapping prefix served by another edge router.

For the purposes of this disclosure, the conflict resolution protocol focuses on the distributed case where the mapping database may not actively participate in the virtual prefix mechanism. In particular embodiments, the concepts of the conflict resolution protocol may be used by a centralized entity (e.g., a mapping database) using the same information flow described herein. It may be noted that in the centralized case, where the virtual prefix mechanism is orchestrated by the centralized entity, prefix overlap across edge routers due to virtual prefixes may be naturally reduced, because the mapping database may be configured to prevent them.

In particular embodiments, the network and edge routers may be configured to permit an edge router to be notified when another edge router registers an overlay prefix that overlaps (with the same or more specific prefix length) with an overlay prefix that the former edge router has registered.

Figure 6:
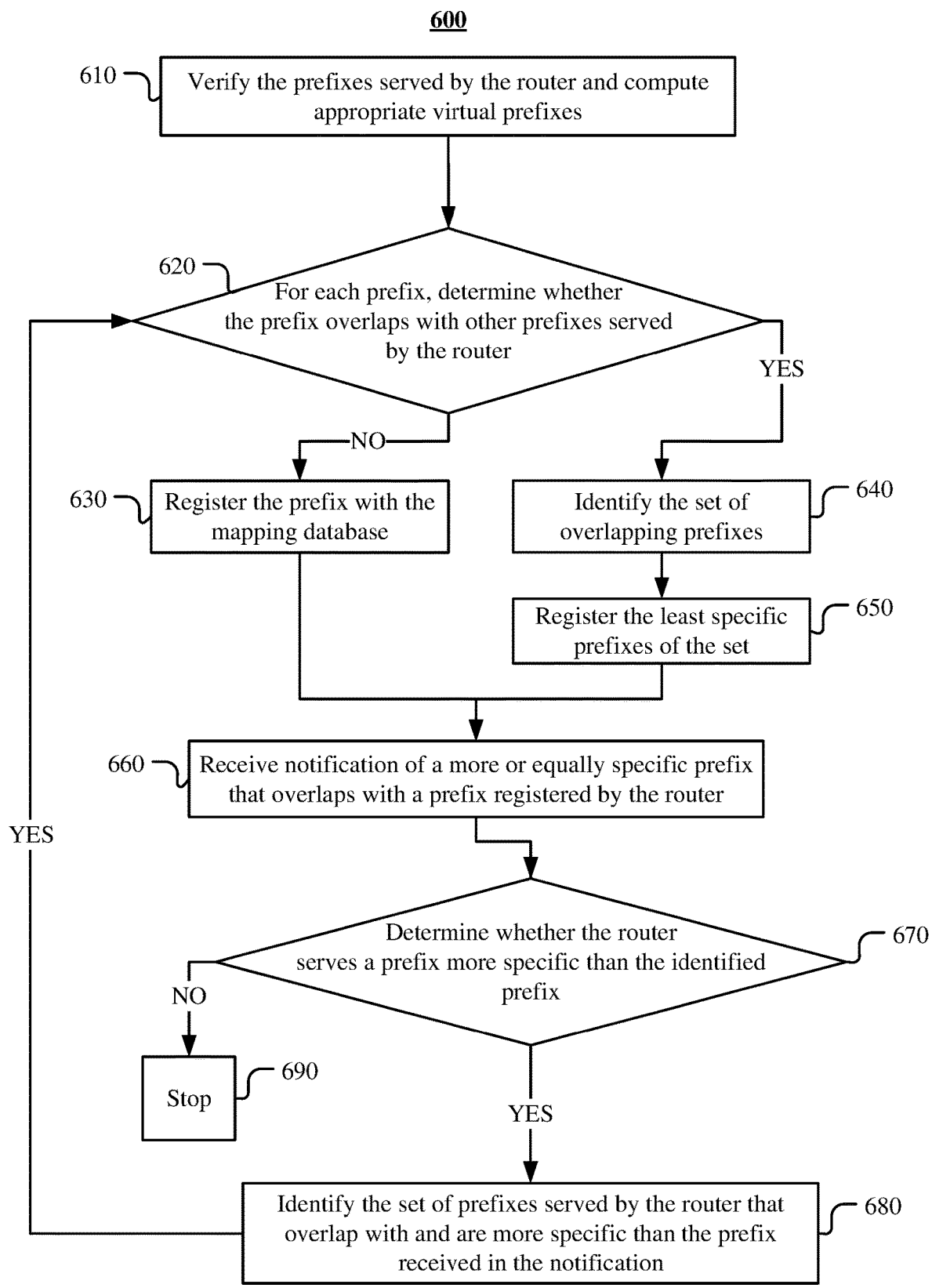
FIG. 6 illustrates an example method for dynamically resolving prefix overlap conflicts.

FIG. 6 illustrates an example method 600 for dynamically resolving prefix overlap conflicts. The method may begin at step 610, where an edge router verifies the prefixes that it is serving and computes any appropriate virtual prefixes. The edge router may use the mechanisms described above and may use the virtual prefixes, aggregation thresholds, de-aggregation thresholds, and prefix lengths provided by one of the mechanisms also described above. At step 620, for each prefix, the edge router determines whether the prefix overlaps with other prefixes served by the edge router. If the prefix does not overlap with other prefixes, at step 630, the edge router registers the prefix directly with the mapping database. If the prefix does overlap with another prefix, at step 640, the edge router identifies the set of overlapping prefixes. At step 650, for each set of prefixes that overlap with each other, the edge router registers only the least specific, non-overlapping prefixes among them.

At step 660, the edge router receives notifications of any more or equally specific prefixes that overlap with any of the prefixes registered by the edge router. Registrations from other edge routers may result in overlaps with the prefixes registered by the edge router. The edge router may receive the notifications from the mapping database within a short amount of time after the edge router registers its prefixes. The edge router may receive the notifications from the mapping database after other edge routers newly register their own prefixes.

At step 670, upon receiving a notification, the edge router may determine if it is serving a prefix (virtual or not) more specific than the one received in the notification. If not, in step 690, the edge router may not take further action, as the system has reached an equilibrium. If so, in step 680, the edge router identifies the set of prefixes served by the router that overlap with and are more specific than the prefix received in the notification. The edge router then proceeds to register those prefixes that are more specific than the one received in the notification, applying again the logic described with respect to step 620. In performing the described method, the edge router may effectively remove the prefixes less specific than the one received in the notification. As new registrations by the edge router or other edge routers in the network may trigger new overlaps, the steps of the method may be repeated.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for dynamically resolving prefix overlap conflicts including the particular steps of the method of FIG. 6, this disclosure contemplates any suitable method for dynamically resolving prefix overlap conflicts including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7A:
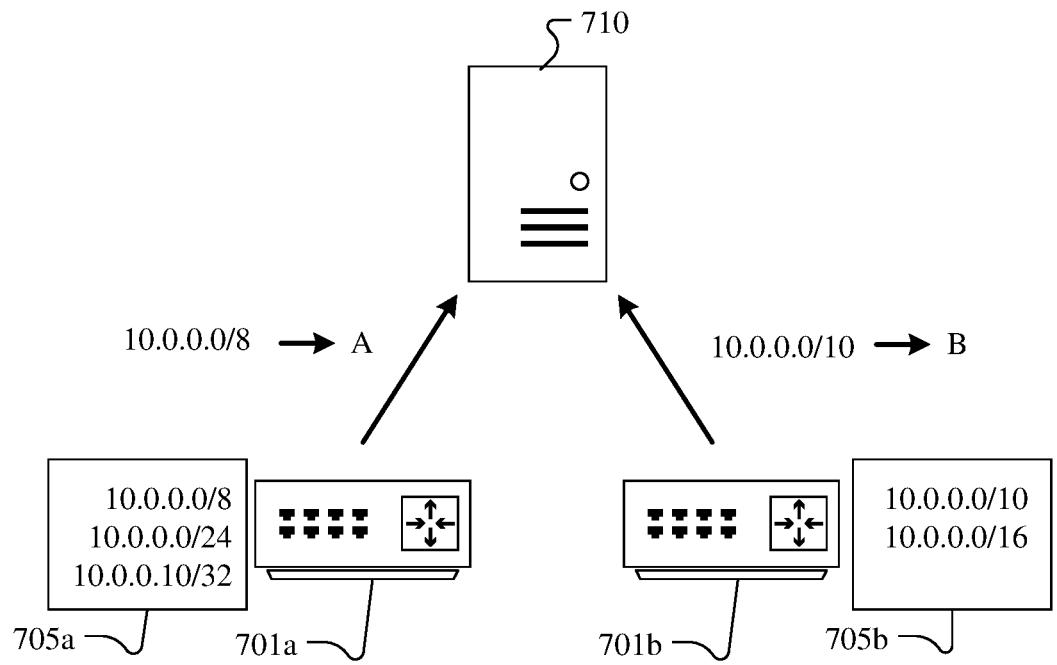
FIGS. 7A-7D illustrate an example of the method for dynamically resolving prefix overlap conflicts.

FIGS. 7A-7D illustrate the protocol for dynamically resolving prefix overlap conflicts in operation with a particular example network. For this example, as shown in FIG. 7A edge routers 701a and 701b are serving different sets of overlapping prefixes. As shown in table 705a, edge router 701a is serving the prefixes 10.0.0.0/8, 10.0.0.0/24, and 10.0.0.10/32. As shown in table 705b, edge router 701b is serving the prefixes 10.0.0.0/10 and 10.0.0.0/16. Following the protocol described above, edge routers 701a and 701b each begin by verifying the prefixes they serve, including calculating any appropriate virtual prefixes. Next, edge routers 701a and 701b determine whether and how to register each prefix served. Edge router 701a analyzes the prefixes it serves and determines that 10.0.0.0/8, 10.0.0.0/24, and 10.0.0.10/32 overlap. Following step 640, edge router 701a determines to register only 10.0.0.0/8 as the least specific prefix—e.g., the prefix with the broadest address space. Edge router 701a sends a registration request (shown as the solid line from the edge router 701a to the mapping database) for the prefix 10.0.0.0/8 to the mapping database 710. Simultaneously, the edge router 701b analyzes the prefixes it serves and determines that 10.0.0.0/10 and 10.0.0.0/16 overlap. Following step 640, edge router 701b determines to register only 10.0.0.0/10 as the least specific prefix—e.g., the prefix with the broadest address range. Edge router 701b sends a registration request (shown as the solid line from the edge router 701b to the mapping database) for the prefix 10.0.0.0/10 to the mapping database 710.

Figure 7B:
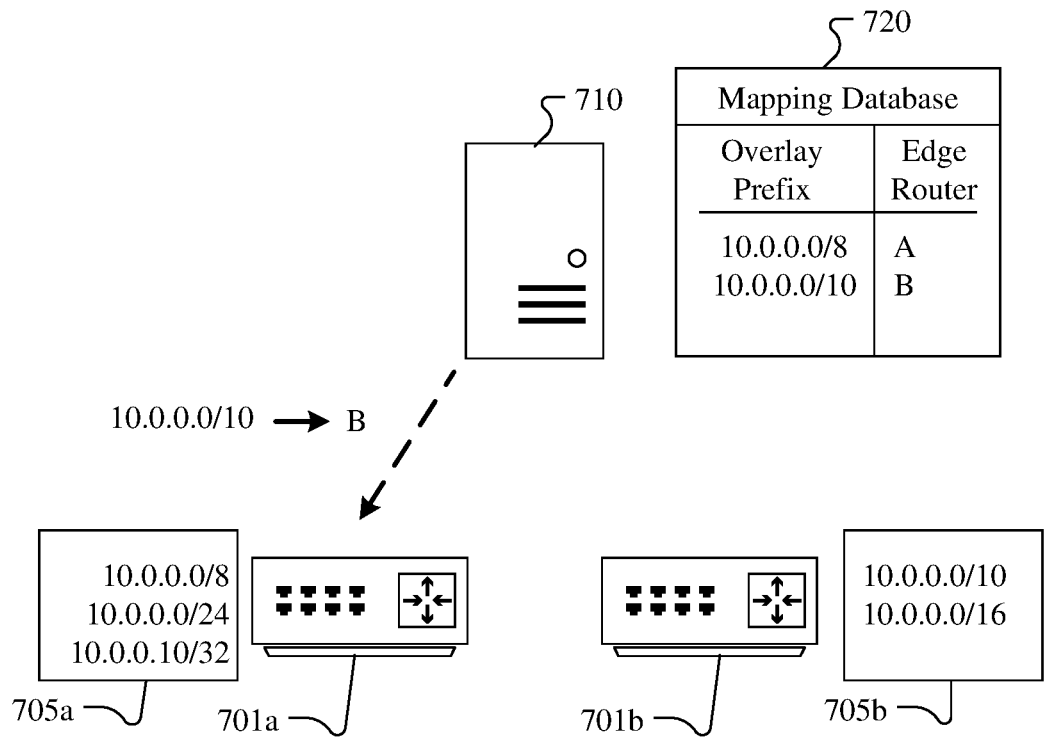

As shown in FIG. 7B, without respect to the order in which they are received, the mapping database analyzes the prefixes 10.0.0.0/8 and 10.0.0.0/10 and determines that the prefixes overlap—e.g., the address space of the prefix 10.0.0.0/10 coincides with the address space of the prefix 10.0.0.0/8. The mapping database 710 notes the intended registrations, shown in the table 720. Because the two prefixes overlap, the mapping database sends a notification (shown as the dashed line from the mapping database 710 to the edge router 701a) to edge router 701a informing the edge router 701a that edge router 701b has registered a more specific prefix (e.g., a prefix with a smaller address space), namely the prefix 10.0.0.0/10.

Figure 7C:
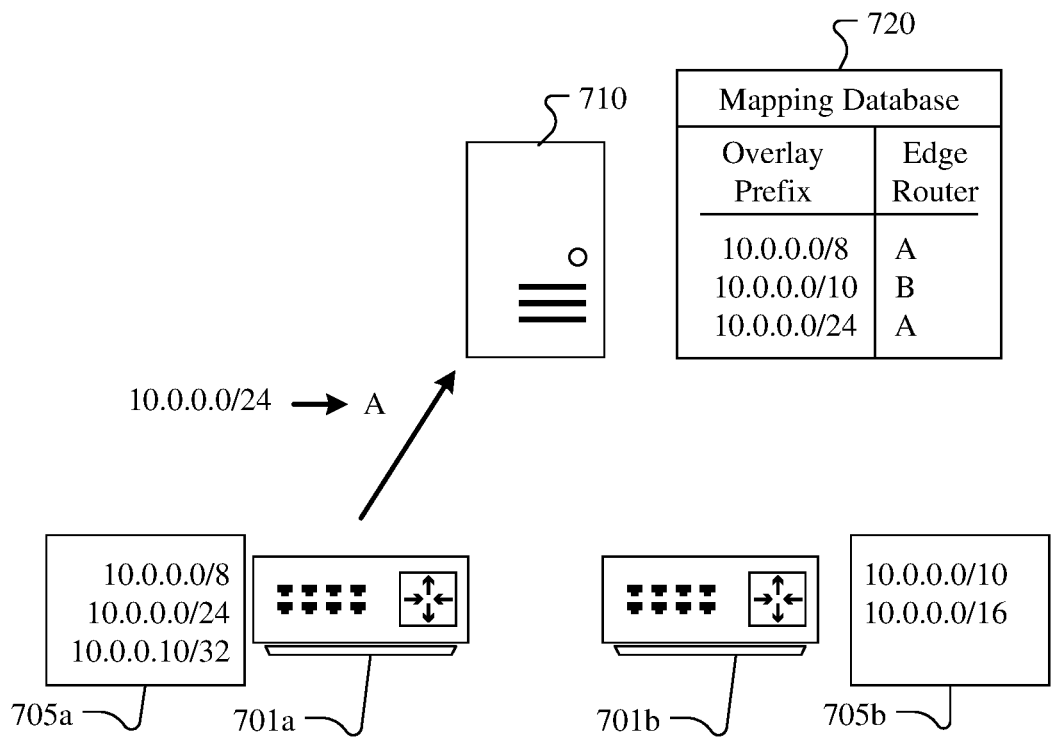

As shown in FIG. 7C, and as in step 660, the edge router 701a receives the notification from the mapping database 710. The edge router 701a re-evaluates the prefixes it is serving to determine whether the edge router 701a is serving a prefix more specific than the identified prefix 10.0.0.0/10—e.g., whether it is serving a prefix with the narrower address space. According to step 620, the edge router 701a compares the prefixes it is serving (10.0.0.0/8, 10.0.0.0/24, and 10.0.0.10/32) and determines that there is an overlap between the prefixes. The edge router determines that the prefix 10.0.0.0/24, which it is serving, is the least specific prefix it is serving that is more specific than 10.0.0.10. In accordance with step 650, the edge router 701a determines to register the prefix 10.0.0.24. Edge router 701*a* sends a registration request (shown as the solid line from the edge router 701*a* to the mapping database) for the prefix 10.0.0.0/24 to the mapping database 710. Thus, the mapping database 710 recognizes this registration request, as shown in the table 720.

Figure 7D:
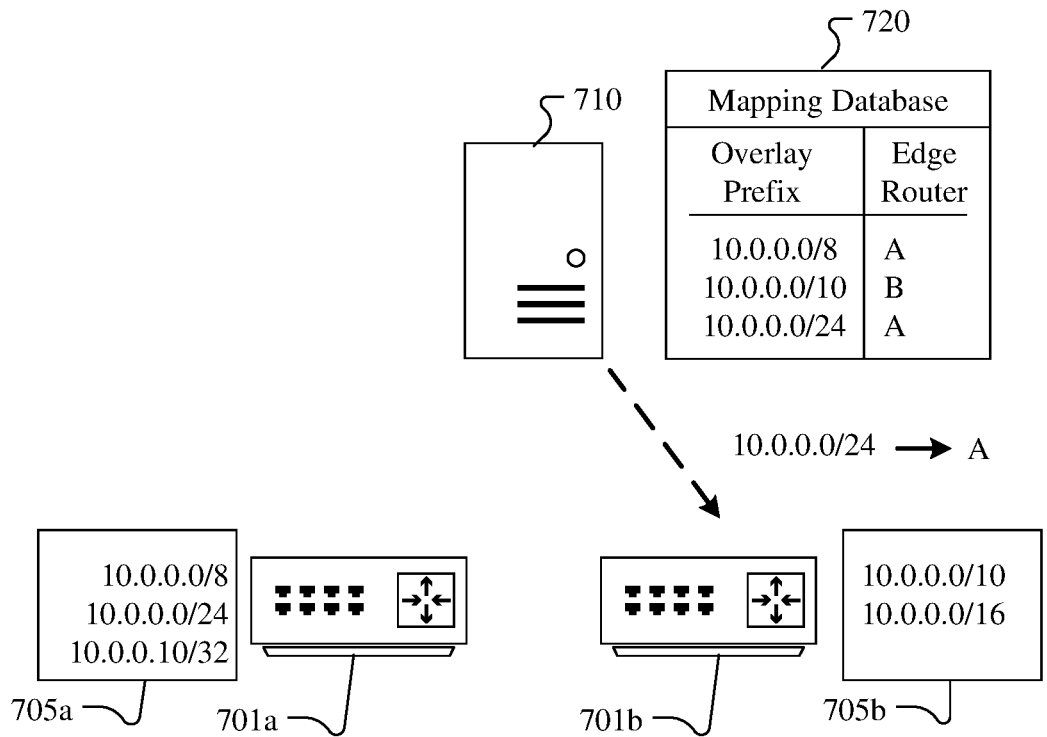

As shown in FIG. 7D, the mapping database 710 analyzes the prefix 10.0.0.0/24 and the previously registered prefixes registered by other edge routers (10.0.0.0/10). The mapping database 710 determines that the prefix 10.0.0.24 overlaps with the prefix 10.0.0.0/10 registered by the edge 701*b*. Because the two prefixes overlap, the mapping database sends a notification (shown as the dashed line from the mapping database 710 to the edge router 701*b*) to edge router 701*b* informing the edge router 701*b* that edge router 701*a* has registered a more specific prefix (e.g., a prefix with a smaller address space), namely the prefix 10.0.0.0/24. According to step 660, the edge router 701*b* receives notification of the prefix 10.0.0.0/24 to edge router 701*a*. According to step 670, the edge router 670 re-evaluates the prefixes it is registering. The edge router 701*b* does not find any prefix that it is serving that is more specific than 10.0.0.0/24 so it does not register any extra prefix (e.g., prefix 10.0.0.0/16 has a broader address space than the prefix 10.0.0.0/24). The network then reaches convergence and awaits changes to the prefixes served by the edge router 701*a* and 701*b*. Note that although edge router 701*a* is serving the prefix 10.0.0.10/32, it may not explicitly register that prefix, further reducing the network state memory required by the mapping database 710 and the configuration communication messaging required to manage the network.

In particular embodiments, during a transition state (e.g., one host moving from a first edge router to a second edge router) different edge routers may try to register the same virtual prefix at the same time. For at least that reason, when an edge router receives a notification that a virtual prefix which the edge router considered as owned has been registered by another edge router, a re-evaluation of the ownership of the virtual prefix should be re-triggered. Aside from transition states, it is expected that the mechanisms described herein will prevent different edge routers from claiming ownership at the same time.

The protocol described above is compatible with a variety of specifications for prefix notifications due to mobility or merge events. For example, using different specification implementations, the notification may reflect a mobility event (and thus the edge router may stop registering the notified prefix) or may reflect that another edge router is co-serving the prefix (and thus registrations for the notified prefix may continue). In both cases, the protocol described above may apply. In particular embodiments, the reception of a prefix of equal length of one registered by an edge router may cause the edge router to re-evaluate the prefixes being registered and may trigger additional registrations.

In particular embodiments, a flag may be added to the mapping database storage structures to specifically mark virtual prefix registrations. Using the flag, it may be acceptable to relax the requirement of selecting virtual prefixes that are guaranteed not to collide with actual prefixes being served in the overlay network. This flag may be relayed in the notification of a more or equally specific prefix that overlaps with a prefix registered by the edge router (e.g., step 660 of the method 600). In this case, an edge router may be able to distinguish the cause for a prefix collision for virtual prefixes it is registering. For example, if the notification comes without the flag, the edge router may determine that the prefix exists in the overlay and thus stops trying to register the virtual prefix. If the notification comes with the flag, it may determine that the collision has been with another virtual prefix (e.g., due to a transition state). Thus, the edge router can re-evaluate and re-try to register the virtual prefix if appropriate. The edge router may be configured to ignore notifications received with the flag set for an actual (e.g., non-virtual) prefix they are registering.

In particular embodiments, virtual prefix registrations from the edge routers may be accompanied or associated with a variable time-to-live (TTL) value. The TTL value may be used to cause an automatic expiration of the registration of a virtual prefix to a particular edge router. At the expiration, if the edge router still qualifies to own the virtual prefix, it may re-register ownership of the virtual prefix with the mapping database. If, however, the virtual prefix does not qualify to own the virtual prefix, then the mapping database may have been automatically cleared of an otherwise inappropriate ownership registration.

The TTL value may be determined by the edge router or may be determined by the mapping database when it receives the ownership registration request. A variety of metrics could be used to determine the appropriate TTL value to use when registering a virtual prefix. For example, the edge router may determine a TTL value to use based on the percentage of prefixes served by the edge router within the virtual prefix address space. Edge routers may be configured to register higher TTL values for a virtual prefix when they hold a large percentage over the aggregation threshold and to register lower TTL values when they are close to the de-aggregation threshold. As another example, TTL values may also be determined based on the ratio of decrement or increment of the virtual prefix percentage served by the edge router over time. The edge router may use lower TTL values when it detects a relatively rapid decrement of the percentage of virtual prefix address space served as it may be likely that the percentage will be soon below the de-aggregation threshold. Conversely, the edge router may use higher TTL values when it detects a relatively rapid increment of the percentage of the virtual prefix address space served as it may be likely that the percentage will be sustained for longer.

Variable TTL values may allow for faster stale entries on the mapping database to be discarded more quickly while also requiring less configuration communication messaging to preserve virtual prefix registrations that are (and should be) present for long periods of time. The applicability of the use of variable TTL depends on the particular characteristics of the network deployment. For example, if a virtual prefix is being registered with a low TTL but needs to be maintained for a long period of time, it may produce extra signaling compared to an environment in which variable TTL is not used. In particular embodiments, to prevent the loss of benefits caused by this situation, the mapping database may be configured not to permit low TTL values to be registered consecutively for the same virtual prefix more than a threshold number of times.

Figure 8:
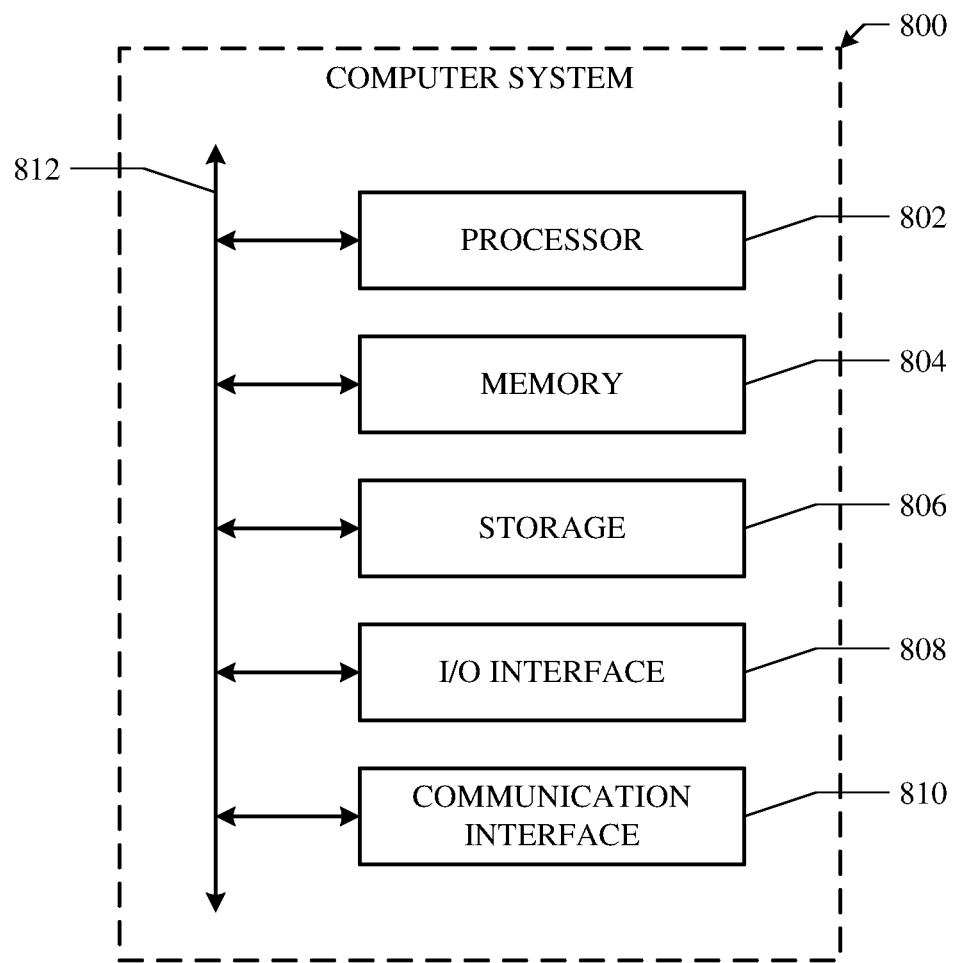
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example, and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A router, comprising:
one or more processors; and
one or more computer-readable non-transitory storage media coupled to the one or more processors and comprising instructions operable when executed by the one or more processors to cause the router to:
store at least one virtual prefix, an aggregation threshold associated with the virtual prefix, and a virtual prefix length associated with the virtual prefix;
register, with a mapping database of an overlay network, ownership of individual prefixes served by the router;
determine an amount of prefixes served by the router that are within an address space of the virtual prefix; and
register, based on a determination that the amount of prefixes satisfies the aggregation threshold, ownership of the virtual prefix with the mapping database of the overlay network;
wherein the registration of ownership of the virtual prefix causes ownership of one or more of the registered individual prefixes served by the router that are within the address space of the virtual prefix to be deregistered.

2. The router of claim 1, wherein the registration of ownership of the virtual prefix causes traffic for prefixes within the address space of the virtual prefix not registered by another router to be directed to the router.

3. The router of claim 1, wherein the registration of ownership of the virtual prefix causes traffic between one or more nodes of the overlay network associated with a prefix within the address space of the virtual prefix not registered by another router to be routed based on the virtual prefix.

4. The router of claim 1, wherein the one or more processors are further operable when executing the instructions to:
store a de-aggregation threshold associated with the virtual prefix;
determine an updated amount of prefixes served by the router that are within the address space of the virtual prefix;
determine that the updated amount of prefixes satisfies the de-aggregation threshold, wherein the de-aggregation threshold is lower than the aggregation threshold; and
send one or more messages to the mapping database to register ownership of each prefix associated with the updated amount of prefixes and deregister ownership of the virtual prefix.

5. The router of claim 1, wherein the virtual prefix and the associated aggregation threshold are pre-assigned to the router.

6. The router of claim 1, wherein a prefix served by the router within the address space of the virtual prefix is an additional virtual prefix with a more specific address space.

7. The router of claim 1, wherein, when executing the instructions to register ownership of the virtual prefix in the mapping database of the overlay network, the one or more processors are further operable when executing the instructions to:
register a time-to-live value for the virtual prefix ownership that corresponds to an amount of time during which the ownership of the virtual prefix will remain active; and
deregister ownership of the virtual prefix after an expiration of the amount of time corresponding to the time-to-live value.

8. The router of claim 7, wherein the time-to-live value is based on a selected one of:
the amount of prefixes within the address space of the virtual prefix over the aggregation threshold that are served by the router; and
a change in the amount of prefixes within the address space of the virtual prefix served by the router over a period of time.

9. The router of claim 1, wherein the one or more processors are further operable when executing the instructions to:
receive a notification from the mapping database that the address space of the virtual prefix overlaps with a second address space of a second virtual prefix owned by a second router of the overlay network;
determine whether the router serves a more specific address space of the virtual prefix than the second address space served by the second router; and
register ownership of a revised virtual prefix associated with the more specific address space.

10. A network controller, comprising:
one or more processors; and
one or more computer-readable non-transitory storage media coupled to the one or more processors and comprising instructions operable when executed by the one or more processors to cause the network controller to:
access, from a mapping database in an overlay network, registrations of one or more individual prefixes by one or more routers in the overlay network;
determine, based on the accessed registrations, a virtual prefix available for registration by one or more routers in the overlay network, an aggregation threshold associated with the virtual prefix, and a virtual prefix length associated with the virtual prefix, wherein a registering router may register ownership of the virtual prefix if an amount of prefixes within an address space of the virtual prefix served by the registering router satisfies the associated aggregation threshold, and wherein in registering ownership of the virtual prefix, ownership of one or more of the registered individual prefixes served by the registering router that are within the address space of the virtual prefix is deregistered; and
send the virtual prefix, the associated aggregation threshold, and the associated virtual prefix length to one or more routers in the overlay network.

11. The network controller of claim 10, wherein the one or more processors are further operable when executing the instructions to:

dynamically update the virtual prefix available for registration by the one or more routers in the overlay network and the aggregation threshold associated with the virtual prefix based on one or more individual prefixes registered in the mapping database by the one or more routers in the overlay network.

12. The network controller of claim 11, wherein when executing the instructions to dynamically update the virtual prefix available for registration by the one or more routers in the overlay network and the aggregation threshold associated with the virtual prefix, the one or more processors are further operable to:
    determine an assignment of one or more virtual prefixes and one or more associated aggregation thresholds for one or more routers of the overlay network;
    determine an effect of the assignment; and
    revise the assignment of virtual prefixes or associated aggregation thresholds based on the determined effect.

13. The network controller of claim 10, wherein the virtual prefix and the associated aggregation threshold are pre-assigned to the network controller.

14. The network controller of claim 10, wherein the one or more processors are further operable when executing to the instructions to:
    receive a registration request by a registering router of the one or more routers in the overlay network for registering ownership of the virtual prefix;
    register, in the mapping database, ownership of the virtual prefix by the registering router; and
    deregister ownership of one or more of the registered individual prefixes served by the registering router that are within the address space of the virtual prefix.

15. The network controller of claim 14, wherein, when executing the instructions to register ownership of the virtual prefix to the router, the one or more processors are further operable when executing the instructions to:
    register a time-to-live value for the virtual prefix ownership that corresponds to an amount of time during which the ownership will remain active; and
    deregister ownership of the virtual prefix after an expiration of the amount of time corresponding to the time-to-live value;
    wherein the time-to-live value is based on a selected one of:
        the amount of prefixes within the address space of the virtual prefix over the aggregation threshold that are served by the router; and
        a change in the amount of prefixes within the address space of the virtual prefix served by the router over a period of time.

16. The network controller of claim 10, wherein the one or more processors are further operable when executing the instructions to:
    determine a de-aggregation threshold associated with the virtual prefix, wherein a router may deregister ownership of the virtual prefix if an updated amount of prefixes within the address space of the virtual prefix served by the router satisfies the de-aggregation threshold; and
    send the de-aggregation threshold associated with the virtual prefix to the one or more routers in the overlay network.

17. A method executed by a router, comprising:
    storing at least one virtual prefix, an aggregation threshold associated with virtual prefix, and a virtual prefix length associated with the virtual prefix;
    registering, with a mapping database of an overlay network, ownership of individual prefixes served by the router;
    determining an amount of prefixes served by the router that are within an address space of the virtual prefix; and
    registering, based on a determination that the amount of prefixes satisfies the aggregation threshold, ownership of the virtual prefix with the mapping database of the overlay network;
    wherein the registration of ownership of the virtual prefix causes ownership of one or more of the registered individual prefixes served by the router that are within the address space of the virtual prefix to be deregistered.

18. The method of claim 17, wherein the router stored at least two virtual prefixes and associated aggregation thresholds, the method further comprising:
    determining an amount of individual prefixes served by the router that are within an address space of a second virtual prefix satisfying a second aggregation threshold;
    determining that the address space of the virtual prefix is less specific than the address space of the second virtual prefix; and
    determining to not register ownership of the second virtual prefix.

19. The method of claim 17, further comprising:
    receiving a notification from the mapping database that the address space of the virtual prefix overlaps with an address space of a second virtual prefix that has been registered by a second router of the overlay network;
    determining that the router serves a more specific address space of the virtual prefix than the address space of the second virtual prefix served by the second router; and
    registering ownership of a revised virtual prefix associated with the more specific address space.

20. The method of claim 17, further comprising:
    storing a de-aggregation threshold associated with the virtual prefix;
    determining an updated amount of prefixes served by the router that are within the address space of the virtual prefix;
    determining that the updated amount of prefixes satisfies the de-aggregation threshold, wherein the de-aggregation threshold is lower than the aggregation threshold; and
    sending one or more messages to the mapping database to register ownership of each prefix associated with the updated amount of prefixes and deregister ownership of the virtual prefix.

* * * * *